United States Patent [19]

Sangu

[11] Patent Number: 4,523,234
[45] Date of Patent: Jun. 11, 1985

[54] SCANNING CONTROL APPARATUS AND METHOD THEREFOR

[75] Inventor: Akio Sangu, Tokyo, Japan

[73] Assignee: Tokyo Shibaura Denki Kabushiki Kaisha, Kawasaki, Japan

[21] Appl. No.: 497,680

[22] Filed: May 24, 1983

[30] Foreign Application Priority Data

Jun. 2, 1982 [JP] Japan .................................. 57-93157

[51] Int. Cl.³ .............................................. H04M 1/10
[52] U.S. Cl. ...................................... 358/293; 358/285
[58] Field of Search ............... 358/293, 294, 264, 267, 358/285, 288, 215, 296

[56] References Cited

U.S. PATENT DOCUMENTS 4,367,493  1/1983  Matteson ............................. 358/293
4,424,535  1/1984  Rothbart et al. ..................... 358/293

Primary Examiner—John C. Martin
Assistant Examiner—Edward L. Coles
Attorney, Agent, or Firm—Cushman, Darby & Cushman

[57] ABSTRACT

A scanning control apparatus includes motor driving circuits and a control circuit. The motor driving circuit drives a motor in a backward direction for a predetermined time counted by a counter. Then, the motor driving circuit drives the motor in a forward direction until the forward velocity of the motor becomes constant before enabling the output from a line scanner.

8 Claims, 12 Drawing Figures

F I G. 4
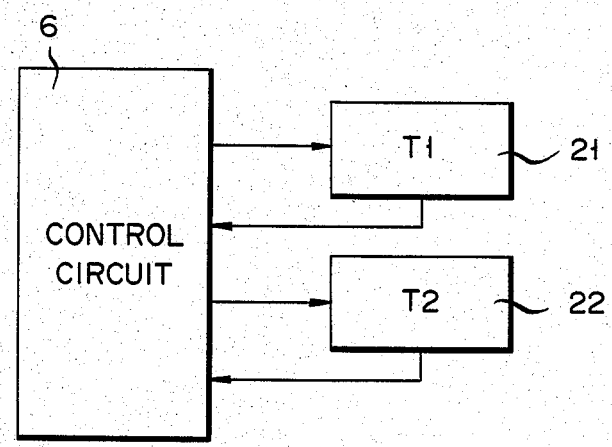
F I G. 5
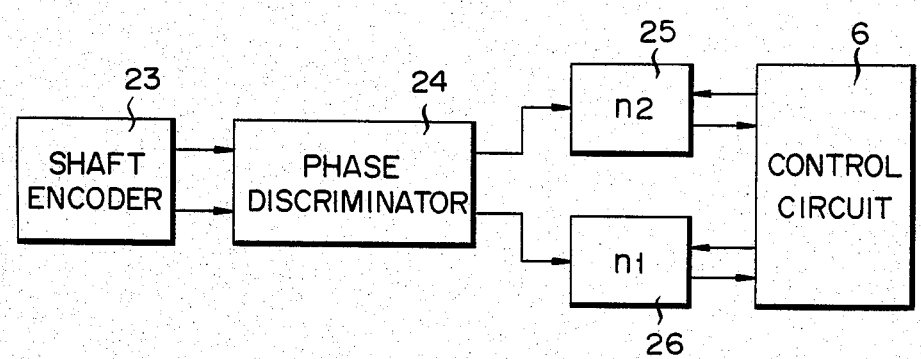

SCANNING CONTROL APPARATUS AND METHOD THEREFOR

BACKGROUND OF THE INVENTION

The present invention relates to an improved scanning control apparatus and method therefor which are applied for an optical character reader or a facsimile device in which a ledger or a document are scanned to obtain picture signals.

Various scanning methods have been developed for optical character readers or facsimile devices. Among of them, a method using a line scanner which comprises a charge coupled device (hereinafter referred to as a CCD) is conventionally known.

In this type of scanning, a main scanning of a ledger or a document is performed by sampling an output from a line scanner in a predetermined period, and a sub-scanning thereof is performed by feeding the ledger or document in a direction perpendicular to the line scanner to obtain picture signals.

Since the sub-scanning is performed by a mechanical operation such as feeding the ledger or the document, a certain time is required for achieving a stable sub-scanning after the start of scanning because of mechanical inertia. FIG. 1 shows a time-feeding distance characteristic of the feeding mechanism in which abscissa and ordinate represent time and feeding distance, respectively.

In FIG. 1, T represents the time that is required for the feeding mechanism to reach a constant velocity. As seen from the figure, the feeding distance per unit time is not constant in the time range of 0 to T.

Therefore, in a prior-art scanning control, the distance between the scanning lines is not uniform in the time range of 0 to T, thereby considerably lowering the quality of the picture signals.

SUMMARY OF THE INVENTION

An object of the present invention is to provide a scanning control apparatus and method therefor in which a picture signal of uniform quality can be obtained.

To achieve the above object, a scanning control means according to the invention comprises scanning means for line-scanning an object, feeding means for feeding the object in a direction perpendicular to a direction of the line-scanning, driving means for selectively driving said feeding means in a forward direction or in a backward direction, and control means for controlling said driving means and said scanning means such that said driving means drives said feeding means in a backward direction at a predetermined time after the apparatus is started, and then drives said feeding means in a forward direction until the forward velocity becomes constant before said scanning means produces scanned data.

BRIEF DESCRIPTION OF THE DRAWINGS

Other objects and features of the present invention will be apparent from the following description taken in connection with the accompanying drawings in which:

FIGS. 3A through 3H are timing charts for the embodiment in FIG. 2 in which; FIG. 3A shows a time-feeding distance characteristic of a ledger; FIG. 3B shows sampling clock signals 13; FIG. 3C shows a scanning command; FIG. 3D shows an integrated pattern; FIG. 3E shows a forward rotation control signal; FIG. 3F shows a backward rotation control signal; FIG. 3G shows a gate signal and FIG. 3H shows a picture signal;

FIG. 4 is a modification of the embodiment in FIG. 2; and

FIG. 5 is another modification of the embodiment in FIG. 2.

DETAILED DESCRIPTION OF THE PREFERRED EMBODIMENT

Figure 1:
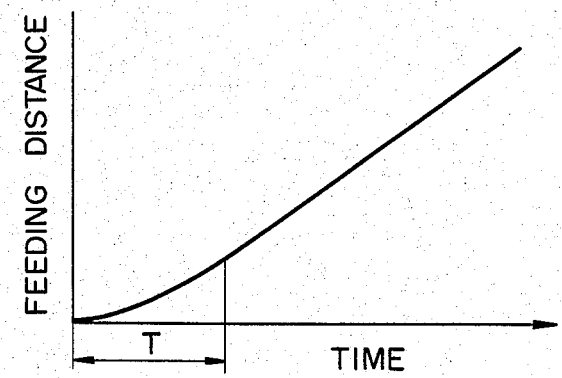
FIG. 1 is a time-feeding distance characteristic of a feeding mechanism.

Now an embodiment of the present invention will be described referring to the drawings.

Figure 2:
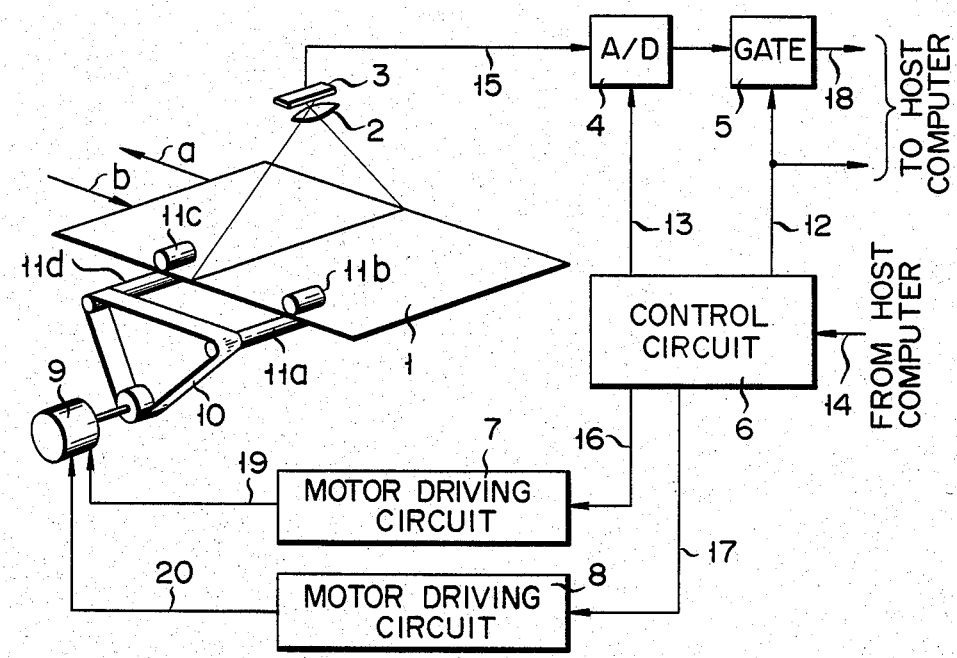
FIG. 2 is a block diagram showing an embodiment of the present invention.

FIG. 2 shows an embodiment of the scanning control apparatus of the present invention. This embodiment includes a focusing lens 2, a line scanner 3, an analog-digital converter (A/D converter) 4 incorporated with an amplifier, control circuit 6, motor drivers 7, 8, a motor 9, drive-belt 10 and pulleys 11a, 11b, 11c and 11d.

As is the case in prior art, the main scanning of the ledger 1 is achieved by sampling an integrated pattern from the line scanner 3 for a predetermined period and the sub-scanning is performed by feeding the ledger 1 using the motor 9, drive belt 10 and pulleys 11a, 11b, 11c and 11d.

The motor 9 is a reversible motor which rotates in either a forward or a backward direction.

The control circuit 6 controls the motor 9 to rotate in the backward direction after the apparatus is started so as to feed the ledger 1 in a backward direction (in a direction designated by an arrow b in FIG. 2). Then, the circuit 6 controls the motor 9 in a forward direction to feed the ledger 1 in a forward direction (in a direction designated by an arrow a in FIG. 2). The control circuit 6 may comprise a microcomputer, for example, Intel 8085 manufactured by Intel Corp. USA. After the feeding velocity becomes stable, a gate signal of logic "1" from the control circuit 6 is applied to the gate 5 to render it open.

The time T1 for feeding the ledger 1 in a backward direction and the time T2 at which the feeding velocity of the ledger 1 becomes constant and the gate 5 is opened, are measured by first and second counters 21 and 22 externally connected to the control circuit 6. These counters 21 and 22 count the received basic clock pulses which are used for the operation of the control circuit 6.

Figure 3:
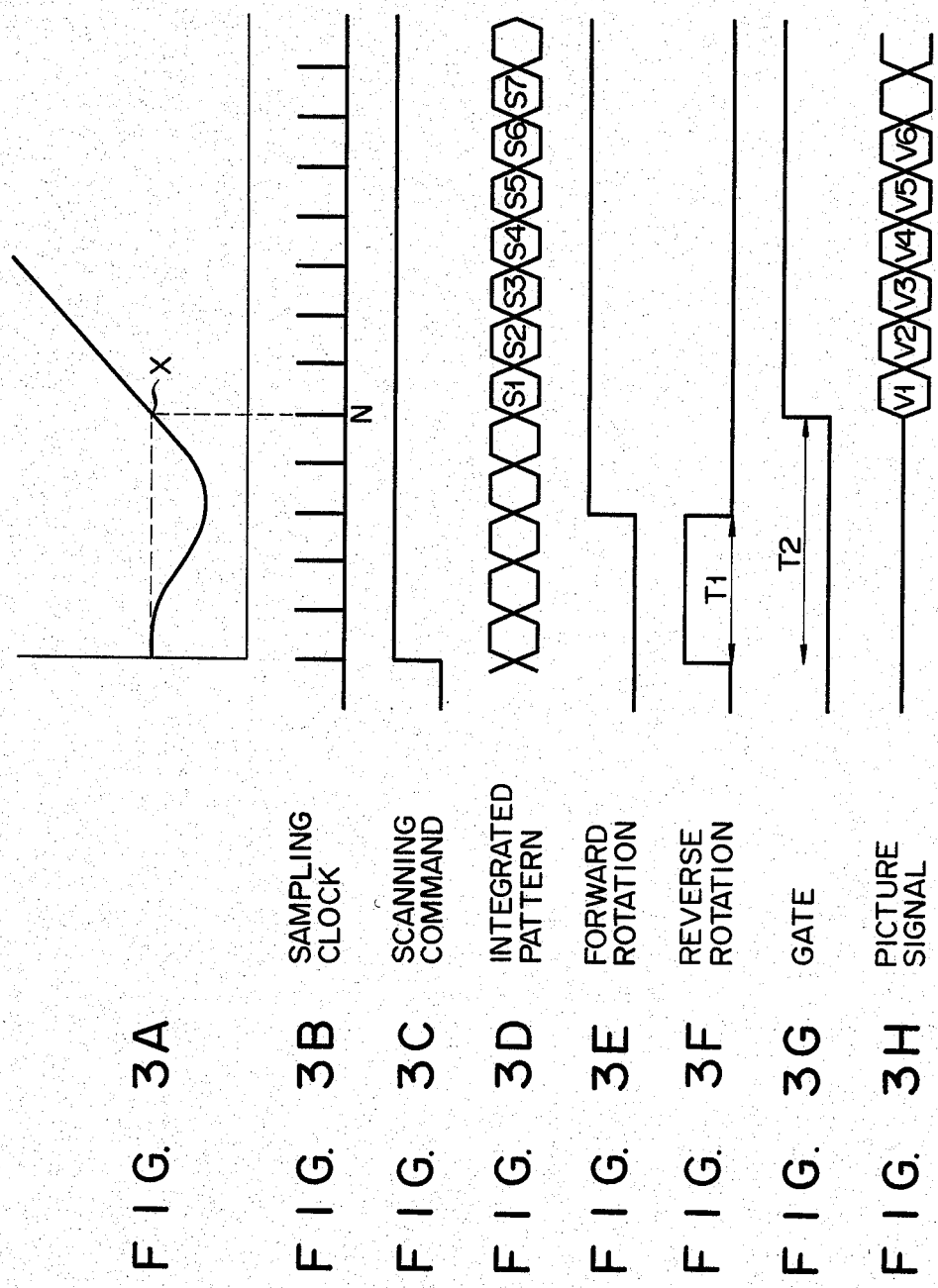

Now an operation of the embodiment will be described referring to the timing charts in FIGS. 3A through 3H. When the scanning command in FIG. 3C is decoded by a host computer, the decoded signal is fed through a line 14 to the control circuit 6. Upon receiving the decoded signal, the control circuit 6 generates sampling clock signals in FIG. 3B which are supplied to the A/D converter 4. Furthermore, the control circuit 6 produces the backward rotation control signal of logic "1" in FIG. 3F which is supplied through a line 17 to the motor driver 8. Therefore, the motor driver 8 applies the backward rotation drive signal to the motor 9 through a line 20. The nature of the motor driver 8 and the backward rotation drive signal depends on the type of motor 9 used. When the motor 9 is a DC servo motor, the motor driver 8 is a voltage source, and the backward drive signal 20 is a DC voltage. On the other hand, when the motor 9 is a pulse motor, the motor driver 8 is a pulse generator and the backward drive signal 20 is a pulse signal.

Then, the motor 9 rotates in a backward direction. The backward rotation of the motor 9 is transferred to the drive belt 10 and to the pulleys 11a, 11b, 11c and 11d. Therefore, the ledger 1 is fed in a backward direction (in a direction designated by an arrow 6 in FIG. 2) as shown in FIG. 3A while being accelerated. After the time T1 has elapsed since beginning the feeding of the ledger 1 in a backward direction, the control circuit 6 controls the backward control signal 17 and the forward control signal such that the backward control signal 17 becomes negative (logic "0") and the forward control signal 20 becomes positive (logic "1"). Therefore, the motor driver 7 produces a forward drive signal 19 and the motor driver 8 ceases to produce the backward drive signal. The fundamental characteristics of the motor driver 7 and the forward drive signal 19 are the same as those of the motor driver 8 and the backward drive signal 20.

Now, the motor 9 rotates in the forward direction by receiving the forward drive signal 19 and the ledger 1 is fed in the forward direction (in a direction designated by arrow a) as shown in FIG. 3A while being accelerated. Then the feeding velocity of the ledger 1 reaches a constant velocity point which is indicated by "X" in FIG. 3A. It is important to keep in mind that the feeding velocity of the ledger 1 should reach a constant velocity before the first scanning line of the ledger 1 reaches the view field of the line scanner 3. Therefore, the feeding time T2 in the backward and forward directions of the ledger 1 must be determined taking into account the effect of mechanical inertia.

When the feeding velocity of the ledger 1 in a forward direction reaches a constant velocity and the first scanning lines reach the view field of the line scanner 3, the integrated pattern 15 corresponding to a one-dimensional image of the first scanning line (which correponds to "$S_1$" in FIG. 3D) is applied to the A/D converter 4 and is quantized at the timing of the Nth sampling clock signal (see FIG. 3B).

On the other hand, the control circuit 6 renders the gate signal 12 positive to open the gate 5. Therefore, the picture signal 18 corresponding to the first scanning line (which corresponds to $V_1$ in FIG. 3H) is transferred to the host computer.

After that, the control circuit 6 keeps both the gate signal 12 and the forward control signal 16 at logic "1". Thus, the picture signals 18 having uniform scanning-line distances are output from the gate 5.

The present invention is not limited to the above embodiment. FIG. 5 shows a modification for the counting of T1 and T2. In this modification, a shaft encoder 23 is fixedly provided around the rotational axis of the motor 9. The two phase signals from the shaft encoder 23 are fed to a phase discriminator 24 to discriminate the forward and backward direction of rotation. The forward rotation signal and the backward rotation signal from the phase discriminator are supplied to counters 25 and 26, respectively. The counters 25, 26 are connected to the control circuit 6 to receive the initial values T1, T2 respectively. Therefore, the counters 25, 26 count the received signals from the phase discriminator 24 until the counted values reach the initial values T1, T2.

Furthermore, when the motor 9 comprises a pulse motor, first and second counters may be provided in the motor drivers 9, 8 respectively to count the received oscillating pulses.

The control circuit 6 has a microcomputer. However, the circuit 6 may include a sequence controller using hardware logic instead. If the control circuit 6 uses a microcomputer, a flexible control for processing ledgers of different weights can be achieved by programming the computation of the times T1 and T2 based on the mechanical inertia.

What is claimed is:

1. A scanning control means, comprising:
   a. scanning means for line-scanning an object;
   b. feeding means for feeding the object in a direction perpendicular to a direction of the line-scanning;
   c. driving means for selectively driving said feeding means in a forward direction or a backward direction; and
   d. control means for controlling said driving means and said scanning means such that said driving means drives said feeding means in a backward direction for a predetermined time after the apparatus is started, and then drives said feeding means in a forward direction until the forward velocity becomes constant before said scanning means produces scanned data.

2. A scanning control means according to claim 1, wherein said control means comprises a microcomputer.

3. A scanning control means according to claim 1, wherein said control means includes:
   a first time-counting means for counting the predetermined time of the feeding means being fed in the backward direction; and
   a second time-counting means for counting a time necessary for the forward velocity of said feeding means to become constant.

4. A scanning control means according to claim 1, wherein said feeding means includes a reversible motor.

5. A scanning control means according to claim 4, wherein said control means includes:
   a shaft encoder for measuring the rotation of said motor;
   a phase discriminator for discriminating the phase of the signal from said shaft encoder;
   first counter for counting the output from said phase discriminator when said motor rotates in a forward direction; and
   second counter for counting the output from said phase discriminator when said motor rotates in a backward direction.

6. A scanning control means according to claim 1, wherein said feeding means includes a pulse motor.

7. A scanning control means according to claim 6, further comprising:
   a first counter for counting forward-rotation pulses to be fed to said motor; and
   a second counter for counting backward-rotation pulses to be fed to said motor.

8. A scanning control method wherein a main scanning of an object is performed by a line scanner and a sub-scanning is performed by feeding the object in a direction perpendicular to a direction of the main scanning to obtain picture signals from the line scanner, comprising the steps of:
   a. feeding the object in a backward direction for a predetermined time after power is ON;
   b. feeding the object in a forward direction until the forward velocity becomes constant; and
   c. enabling the output from the line scanner.

* * * * *